M. G. COWPER-SMITH.
AUTOMATIC CONTROLLING APPARATUS FOR LIGHTING SYSTEMS.
APPLICATION FILED SEPT. 20, 1909.
972,752.
Patented Oct. 11, 1910.
2 SHEETS—SHEET 1.
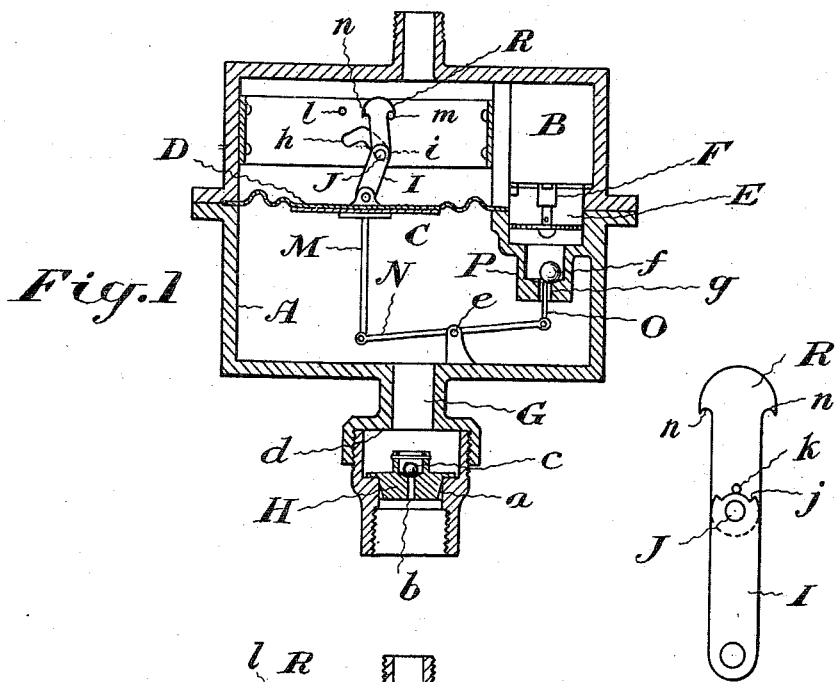
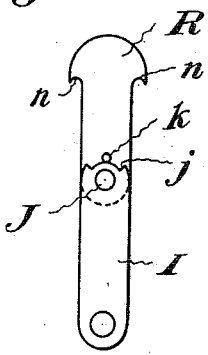
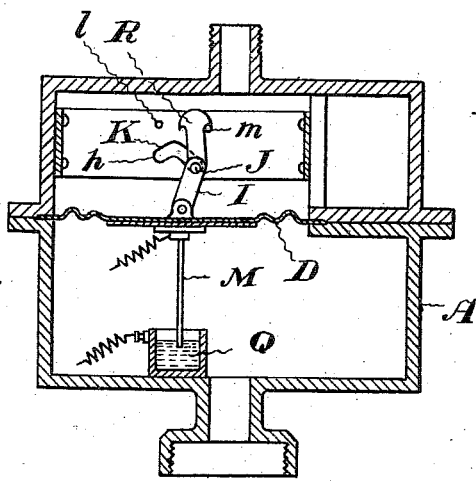
WITNESSES:
INVENTOR.
BY
ATTORNEYS.

# UNITED STATES PATENT OFFICE.

MERVYN G. COWPER-SMITH, OF TORONTO, ONTARIO, CANADA.

AUTOMATIC CONTROLLING APPARATUS FOR LIGHTING SYSTEMS.

972,752. Specification of Letters Patent. Patented Oct. 11, 1910.

Application filed September 20, 1909. Serial No. 518,633.

*To all whom it may concern:*

Be it known that I, MERVYN G. COWPER-SMITH, of the city of Toronto, in the Province of Ontario, Canada, have invented certain new and useful Improvements in Automatic Controlling Apparatus for Lighting Systems, of which the following is a specification.

This invention relates to means whereby illuminating devices at various distant points may be lighted and extinguished from a central station by a temporary increase in the pressure of an elastic fluid in a main extending from the central station to the said illuminating devices.

I accomplish my object by utilizing the electric fluid pressure in a main to lift a diaphragm which carries a swinging lever and tumbler, which coöperate with a slotted plate and pins thereon to hold the diaphragm consecutively in a plurality of positions at different heights following consecutive impulses in the fluid pressure. The position of the diaphragm determines the opening or closing of a valve controlling the flow of gas to a burner or the making or breaking of an electric contact. Means are provided to insure a difference of pressure between opposite sides of the diaphragm and means are also preferably provided whereby the pressure below the diaphragm is normally below the pressure in the main but rises at once to the pressure in the main when the latter is raised sufficiently above its normal.

Figure 2:
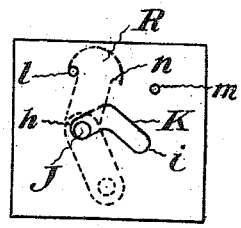
Figure 3:
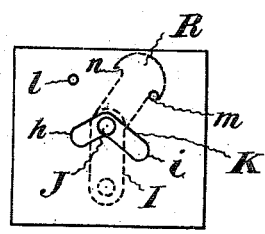
Figure 4:
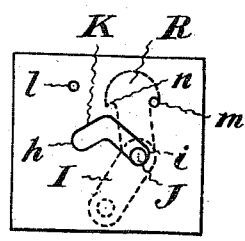
Figure 5:
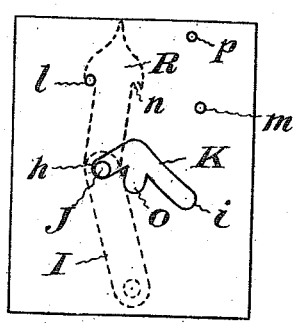

Figure 1 is a vertical section of my improved controller. Figs. 2 to 4 are detailed views showing various positions of the simplest form of the controlling parts. Figs. 5 to 12 are similar views showing various positions of an elaborated form of the controlling devices. Fig. 13 is a view similar to Fig. 1 showing the device as used to control an electric lighting circuit. Fig. 14 is a detail of the joint between the tumbler and arm.

A is a chamber divided into two parts B and C by a flexible diaphragm D. Between the two chambers there is, however, a communication formed through the opening E. This opening is controlled by a pressure regulating valve F. This may be of any ordinary type and requires no detailed description. As the device is intended to operate by an increase of pressure in the main this regulating valve is intended to prevent this increase of pressure at once equalizing between the parts B and C of the chamber. When the regulating valve is employed a difference of potential is obtained sufficient to lift the diaphragm and operate the working parts, as hereinafter described. As the pressure in the main conveying the elastic fluid is normally greater than that required at the burners, I also provide the inlet G into the lower part C of the chamber with a pressure regulating valve H which is of the ordinary lift type and provided with the apertures $a$ around its stem through which the elastic fluid may pass. The weight of this valve and the size of its passages will be so regulated as to give the necessary reduction in pressure between the main and the chamber. A by-pass is, however, provided preferably by forming an opening $b$ of some considerable size through the center of the valve H. This opening is controlled by a ball $c$.

When the abnormal increase of pressure hereinbefore referred to is produced in the main, the pressure regulating valve H will rise and contact with the seat $d$ above it, and the gas supply around the valve is cut off. The abnormal pressure, however, will be sufficient to lift the ball $c$ and the full pressure from the main will be admitted to the lower part C of the chamber, and as this pressure is prevented by the regulating valve F from equalizing between the upper and lower chambers practically the full abnormal pressure in the main is available to operate the movable parts hereinafter described.

Pivoted centrally to the flexible diaphragm is an arm I having at its upper end a pin J. This pin is adapted to move in a slot K, formed in a suitably supported plate L. This slot K is of substantially an L-shape, the angle being uppermost. This angle, however, is preferably rounded off as shown. One end of the slot is formed higher than the other so as to give two positions of rest for the pin J, one higher than the other. This difference of height is utilized to operate a cut-off device in the following manner. Depending from the under side of the diaphragm D is a pin M. This pin is pivotally connected to one end of a lever N fulcrumed at $e$ on a stationary part of the apparatus. To the other end of the lever is suitably connected a pin O adapted to contact with the under side of a ball $f$ normally tending to seat itself at the upper end of the opening $g$ formed in the tube P leading to the pressure regulating valve F. When the pin J is in the higher end $h$ of the slot, the pin O is out of contact with the ball $f$ and the communication between the parts B and C of the chamber is cut off. When the pin is in the lower end $i$ of the slot the pin O contacts with the ball. The ball O thus forms a cut-off device by means of which the supply of gas to a burner or burners may be cut off as desired.

If the pressure of the elastic fluid is used to control an electric lighting system, the pin M may be connected with an electric wire and a mercury cup Q, or other contact device provided, which is connected with another electric wire. The insertion or withdrawal of the pin in the mercury can be thus utilized to make or break the electric circuit.

The arm I with its pin J is caused to assume alternately the positions shown in Figs. 2 and 4 by the following mechanism: On the upper end of the arm is pivoted the tumbler R. The joint between the tumbler and the arm is so constructed that the tumbler will have a limited swing only in either direction, and in Fig. 14 I show an arrangement for this purpose. Two shoulders $j$ are formed either on the tumbler or the arm and a pin $k$ on the other part is adapted to play between the shoulders, the limits of the movement being determined by the position of the shoulders.

Adjacent to the end $h$ of the slot is a pin $l$, and adjacent to the lower end $i$ of the slot is a pin $m$. The tumbler is preferably provided with shoulders $n$ adapted to engage these pins.

The operation of the device as described is as follows: When the diaphragm is in a raised position and the cut-off closed the arm I is inclined toward the left and the tumbler toward the right engaging with one of its shoulders $n$ the pin $l$. An increase of pressure below the diaphragm causes the latter to lift and raise the parts to the position shown in Fig. 3. As the diaphragm descends when the pressure falls again the weight of the tumbler tends to cause the pin J to move on down the long arm of the slot instead of returning to its initial position. Before the pin reaches the end $i$ of the slot the right hand shoulder $n$ on the tumbler has engaged the pin $m$ and the tumbler is tilted over, as shown in Fig. 4. Another rise and fall of the diaphragm will in a similar manner cause the parts to reassume the position shown in Fig. 3.

Figure 6:
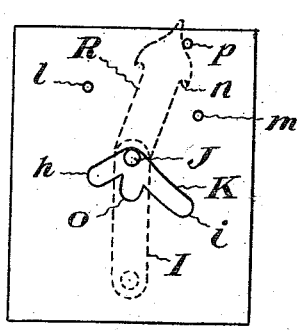
Figure 7:
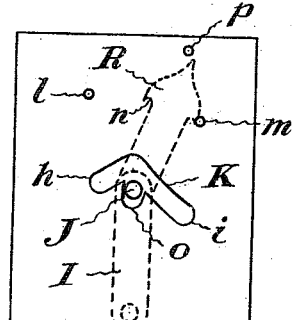
Figure 8:
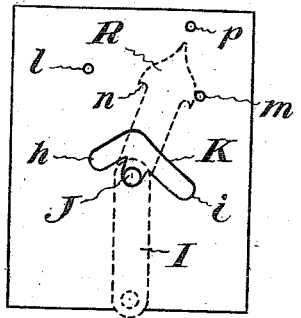
Figure 9:
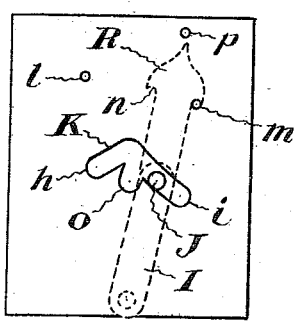
Figure 10:
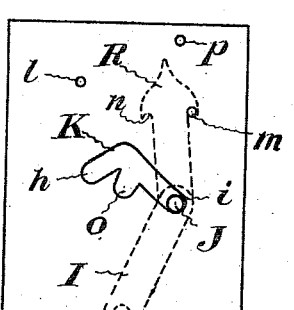
Figure 11:
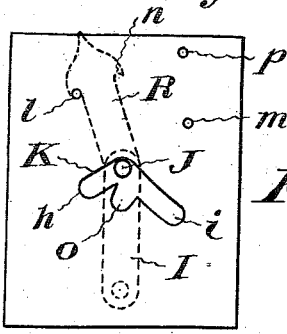

As it is frequently necessary to extinguish certain lamps or groups of lamps at an early hour, while others are not extinguished till a later hour, it will usually be necessary to employ a somewhat more complex arrangement. An arrangement of the parts for this purpose is shown in Figs. 5 to 11 of the drawings. The L-shaped slot remains the same but is provided between its ends with a central depression $o$, the bottom of which is intermediate in height the bottoms of the ends of the slot. As it is necessary to guide the pin J *seriatim* to the three positions represented by the ends of the slot and the central depression it is necessary to further provide a pin $p$ with which the end of the tumbler may engage, as shown in Fig. 6, when the pin J rises from the end $h$ of the slot to the highest point in the slot. When the pin descends it will be guided into the central depression, but before the pin reaches the bottom of the depression the end of the tumbler will have passed the pin $p$, so that on the next rise and fall of the arm through the action of the diaphragm the pin and arm will assume the position shown in Fig. 10. The return movement from the right hand to the left hand end of the slot is as in the construction shown in Figs. 2 to 4. An intermediate stage of this movement is shown in Fig. 11.

Figure 12:

With the arrangement of slot just described there are two "off" positions and one "on" position. In Fig. 12 I show a slot in which the ends are level with one another. This will give two "on" positions and one "off" position. Lamps which are to be extinguished early have their controllers arranged as shown in Figs. 5 to 11: those which are to be extinguished later have their controllers arranged as shown in Fig. 12. Thus presuming the lamps to be alight the pins J will be in the right hand ends of the slots, a rise and fall of pressure will move them to the left hand ends of the slots. In one set of lamps, as this end is high, the lamps will be extinguished: in the other set the end is low and the lamps will remain alight. The next rise and fall of pressure will move the pins J to the central depressions which in each case are high and hence the early extinguished lamps remain out while the burning lamps are extinguished. Another rise and fall of pressure returns them to the original position in which all the lamps are alight.

It will be understood, of course, that in systems such as described pilot lights are maintained in connection with each burner, so that the lamps light up immediately the supply of gas is turned on. It will also be understood that any of the well known equivalents for the flexible diaphragm may be employed. The outlet S from the chamber B will in practice be connected with a gas burner or group of burners.

What I claim as my invention is:—

1. In apparatus for controlling illuminating devices the combination of a movable diaphragm; a cut-off device movable thereby; a pivoted arm movable by the diaphragm; a plate having a slot therein with which the arm engages adapted to guide the arm to, and support it in, a plurality of positions at different heights; a tumbler pivoted on the arm; and stationary means with which the tumbler co-acts to determine the position relative to the slot toward which the arm moves when actuated by the diaphragm.

2. In apparatus for controlling illuminating devices the combination of a movable diaphragm; a cut-off device movable thereby; a pivoted arm movable by the diaphragm; a plate having a slot therein with which the arm engages adapted to guide the arm to, and support it in, a plurality of positions at different heights; and means whereby the arm is directed to assume *seriatim* each of said positions when alternately raised and lowered by the diaphragm.

3. In apparatus for controlling illuminating devices the combination of a movable diaphragm; a cut-off device movable thereby; a pivoted arm movable by the diaphragm; and a plate having a slot therein with which the arm engages adapted to guide the arm to, and support it in, a plurality of positions at different heights.

4. In apparatus for controlling illuminating devices the combination of a movable diaphragm; a cut-off device movable thereby; a pivoted arm movable with the diaphragm; a pin on said arm; a plate having an L-shaped slot therein in which the pin may move, one end of the slot being lower than the other; a tumbler pivoted on the arm; means limiting the swing of the tumbler on the arm; and means adjacent each end of the slot for tilting the tumbler on the arm.

5. In apparatus for controlling illuminating devices the combination of a movable diaphragm; a cut-off device movable thereby; a pivoted arm movable with the diaphragm; a pin on said arm; a plate having an L-shaped slot therein in which the pin may move, one end of the slot being lower than the other; a tumbler pivoted on the arm and having a shoulder formed thereon at each side; means limiting the swing of the tumbler on the arm; and pins adjacent the ends of the slots with which the aforesaid shoulders may engage.

6. In apparatus for controlling illuminating devices the combination of a movable diaphragm; a cut-off device movable thereby; a pivoted arm movable with the diaphragm; a pin on said arm; a plate having an L-shaped slot formed therein with the angle upward and in which the pin may move, the slot being provided with a depression intermediate the ends; a tumbler pivoted on the arm; means limiting the swing of the tumbler on the arm; and three pins on the plate with which the tumbler co-acts placed on the plate to cause the tumbler to direct the arm to cause the pin to assume *seriatim* an end position, a position in the central depression and a position in the other end and to then recommence the series when the arm is alternately raised and lowered by the diaphragm.

7. In apparatus for controlling illuminating devices the combination of a movable diaphragm; a cut-off device movable thereby; a pivoted arm movable by the diaphragm; a tumbler pivoted on the arm; means limiting the swing of the tumbler on the arm; and means co-acting with the tumbler and arm to cause the latter to take up by the rise and fall of the diaphragm a plurality of positions determining the opening or closing of the cut-off.

8. In apparatus for controlling illuminating devices a chamber divided into two compartments one provided with a gas inlet to receive gas from a main and the other with a gas outlet to discharge gas to a burner; a movable diaphragm exposed at one side to one compartment and at the other side to the other compartment; a pressure regulating valve between the two compartments independent of the diaphragm; a cut-off device; and means operable by the rise and fall of the diaphragm for operating said device.

9. In apparatus for controlling illuminating devices a chamber divided into two compartments, one provided with an inlet to receive gas from a main and the other with an outlet to discharge gas to a burner; a pressure regulating valve controlling the inlet and provided with a by-pass; a weighted valve normally closing the by-pass; a movable diaphragm exposed at one side to the other compartment; a pressure regulating valve between the two compartments independent of the diaphragm; a cut-off device; and means operable by the rise and fall of the diaphragm for operating said device.

Dated, this 16th day of September 1909, Toronto Canada.

MERVYN G. COWPER-SMITH.

Signed in the presence of—
   JOHN G. RIDOUT,
   A. CAMPBELL.